Figure 1:
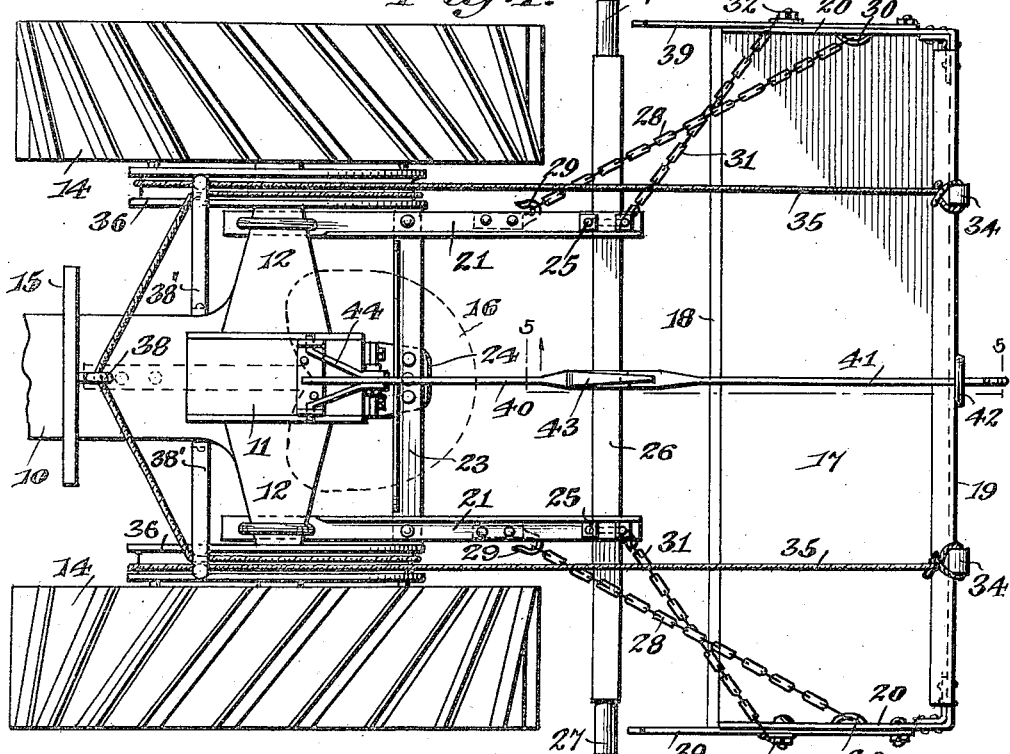

June 19, 1923.

E. J. ANDREWS

SCRAPER ATTACHMENT FOR TRACTORS

Filed Feb. 24, 1922   3 Sheets-Sheet 1

1,459,566

Edgar J. Andrews, INVENTOR.

BY Geo. P. Kimmel, ATTORNEY.

June 19, 1923.  1,459,566
E. J. ANDREWS
SCRAPER ATTACHMENT FOR TRACTORS
Filed Feb. 24, 1922   3 Sheets-Sheet 2

Edgar J. Andrews, INVENTOR.

BY Geo. P. Kimmel, ATTORNEY.

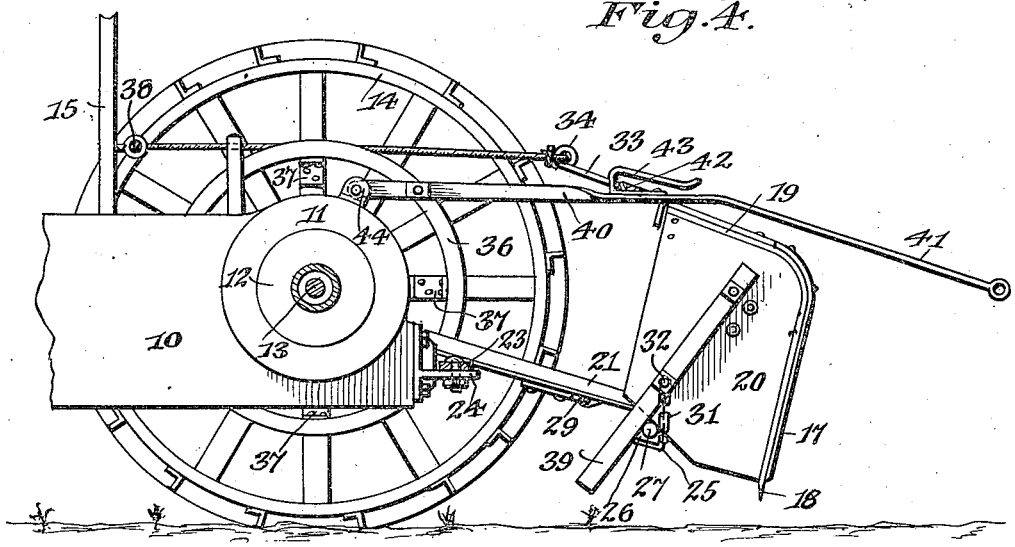
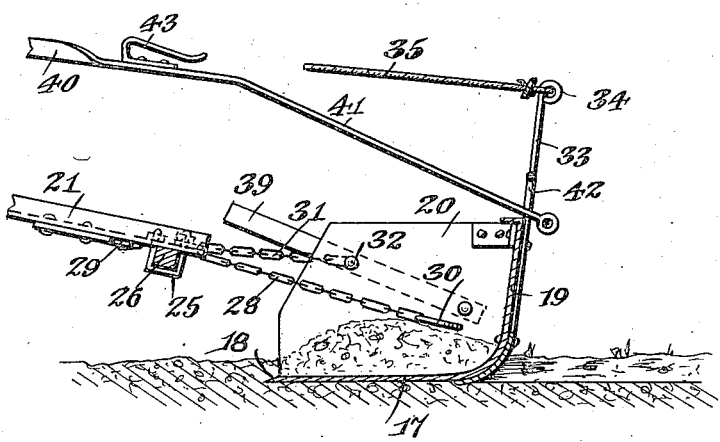

Patented June 19, 1923.

1,459,566

UNITED STATES PATENT OFFICE.

EDGAR J. ANDREWS, OF RUPERT, IDAHO.

SCRAPER ATTACHMENT FOR TRACTORS.

Application filed February 24, 1922. Serial No. 538,848.

*To all whom it may concern:*

Be it known that I, EDGAR J. ANDREWS, a citizen of the United States, residing at Rupert, in the county of Minidoka and State of Idaho, have invented certain new and useful Improvements in Scraper Attachments for Tractors, of which the following is a specification.

This invention appertains to scraper attachments for tractors generally, and more particularly to a type of such scraper attachments adapted for use on Fordson tractors.

In the practice of earth working, and more particularly in grading and scraping operations pertaining thereto, it is a well known fact that a majority of the numerous types of wheel tractors lack sufficient traction for the power developed by the same, especially, when operating on soft ground, or when heavily loaded, or overloaded as often is the case in working a Fresno. It also happens, that in the dumping operation of a Fresno scraper by the direct pull of a tractor and when the initial dumping movement of the scraper is accomplished by the engagement or cutting into the ground surface of the earth cutting blade or edge therefor for the purpose and the draft strain is greatest, the tractor will be stalled, and can only be put into forward or backward motion by dumping the load of the scraper at the point of stalling. These disadvantages in scraping operations are generally due to the fact that the scrapers have been, in every known instance, connected to the tractors in a manner that the same were always in contact with the ground surface when empty, and with the result of often picking up a load or a partial load prior to the reaching of the desired point of scraping operations, so that the stalling of tractors is of frequent occurrence, and causes an undue loss in time, with an accompanying increased cost in the excavating or grading operation, and is a source of much trouble and worry to the operator.

It is the principal object of the present invention thereof to provide for an improved means for mounting scrapers on wheel tractors, or otherwise connecting the same thereto, whereby to overcome the foregoing disadvantages now obtaining in the known methods of mounting scrapers on or connecting them to wheel tractors.

Another object of the invention is to provide for a scraper attachment of the class mentioned, and one involving a means, whereby the same is under the direct control of the operator of a tractor and is operable by power from the tractor indirectly applied thereto for the purpose, as distinguished from the now known manner of effecting such operation by the direct pull of the tractor.

A further object of the invention is to provide for a scraper attachment of the type mentioned, and one embodying a novel form of mounting, whereby to be supported free or clear of the ground surface, when not active for scraping operations, and which will eliminate the possibility of the accidental picking up of a load or partial load such as would tend to cause a stalling of the tractor to which it is attached, or otherwise slow down or halt the progress of the work.

With the foregoing and other and equally important objects in view, the invention resides in the certain new and useful construction, arrangement and operation of parts, as will be hereinafter more fully described, set forth in the appended claims, and illustrated in the accompanying drawings, in which:—

Figure 1 is a fragmentary top plan view of a Fordson type of wheel tractor, and of a preferred embodiment of the scraper and its operating mechanism as applied thereto.

Figure 6:
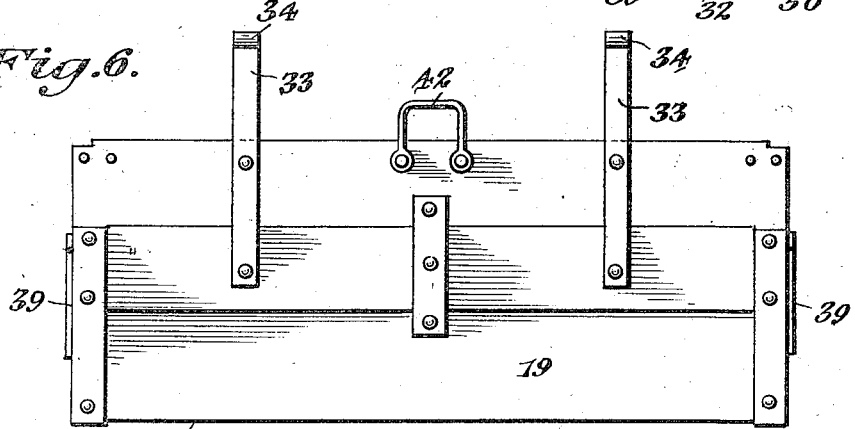
Figure 2:
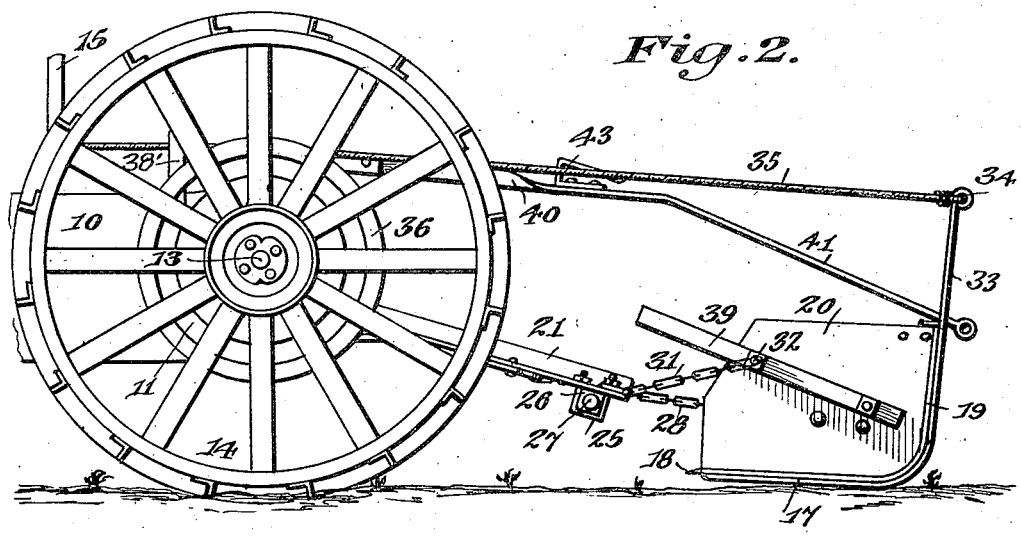
Figure 3:
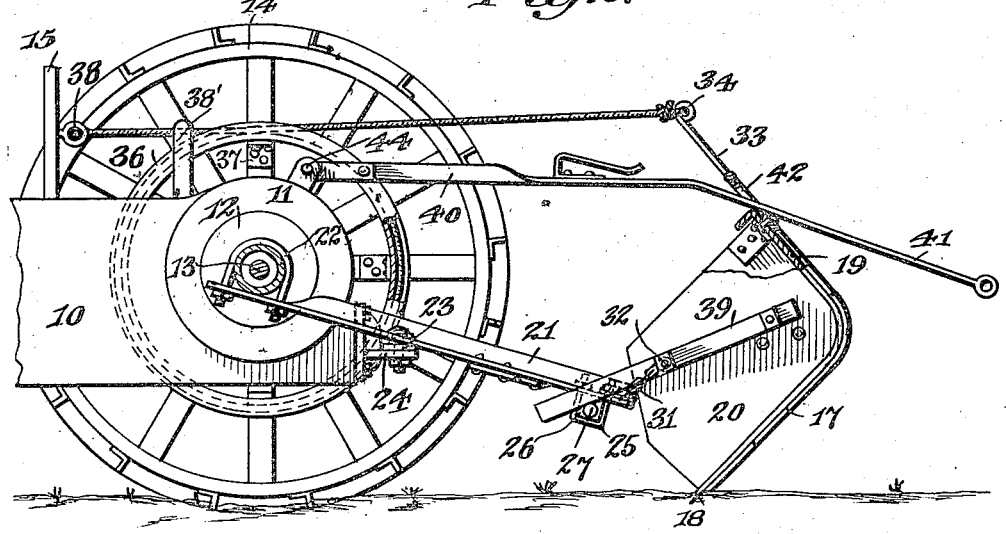

Fig. 2 is a side elevation of the rear end portion of a tractor and showing the scraper in load carrying position, Fig. 3 is a similar view showing the scraper in load dumping position, one wheel of the tractor being removed to more clearly show the scraper operating mechanism, Fig. 4 is a view similar to that of Fig. 3, but showing the scraper in raised or inoperative position, whereby to facilitate the free movement or travel of the tractor to the point of work, Fig. 5 is a vertical section taken on the line 5—5 of Fig. 1, and, Fig. 6 is a rear elevation of the scraper per se.

Referring to the drawings, wherein similar characters of reference designate corresponding parts throughout the several views thereof, the numeral 10 indicates the transmission housing of a tractor; 11 the differential housing at the rear end of the transmission housing; 12 the axle housings extending outwardly of the opposite sides or ends of the differential housing 11 and in the transverse direction of the tractor; 13 the axle sections disposed within the axle housings 12 and driven from the differential mechanism located within the differential housing 11; 14 the traction wheels mounted on the axle sections 13; 15 the dash; and 16 the operator's seat supported in position upon the differential housing 11 and spaced in rear of the dash 15, which assembly of elements or parts is common to the Fordson type of tractor, and does not constitute any part of the present invention.

The scraper contemplated for use in accordance with the invention is of the ordinary type comprising an elongated shovel-like body formed of a bottom wall 17 having a front bevelled cutting edge 18 and its rear edge merging into a rear vertical wall 19 and end walls 20 rising from the opposite ends of the bottom wall 17 and connecting the rear wall 19 at their rear vertical edges, substantially as is shown, the cutting edge 18 of the bottom wall 17 projecting beyond the plane of the front vertical edges of the end walls 20 so as to effect a uniform scraping of the earth throughout the entire length of the scraper.

For mounting the scraper in position at the rear end of a tractor, a frame is provided, and the same comprises a pair of rearwardly disposed draft bars 21, preferably in the form of suitable lengths of angle iron, which are correspondingly inclined in a forward direction and have their forward ends secured to the axle housings 12 at the opposite sides of the differential housing 11, by means of U-bolts or the like 22. The bars 21 are supported in desired inclined parallel relation by means of a transversely disposed brace bar 23, which is bolted in position on the usual draft cap 24 carried at the rear end of the differential housing 11 of the tractor, the opposite ends of the bar 23 engaging beneath the bars 21 at points medially of their lengths and are bolted thereto for the purposes intended. Secured at the under side of the rearwardly disposed free ends of the bars 21, by means of U-bolts or the like 25, is a transversely disposed scraper supporting bar 26, which is preferably square in cross section throughout its intermediate length, and between its opposite end portions 26 which are circular in cross section, as at 27, for purposes which will be hereinafter more fully explained.

The scraper is normally disposed in rear of the tractor, and is arranged to operate in parallel relation with respect to the bar 26, the draft of the tractor being transmitted to the same by means of draft chains or flexible connections 28, which are coupled at their forward ends to hooks 29 carried on the under sides of the draft bars 21 at points inwardly of the rear ends of the latter, and connect at their outer ends, as at 30, to the inner sides of the end walls 20 of the scraper. These draft chains 28 extend diagonally outward and rearwardly from their points of connection with the hooks 29, and equally so, to center the scraper at the rear of the tractor in its forward direction of travel, and to prevent endwise movement to the scraper in any of its positions of operation during the travel of the tractor, other chains or flexible connections 31 are provided, and these are connected at their inner ends with the U-bolts 25 at the extreme rear ends of the draft bars 21, and at their outer ends to points as at 32, on the outer faces of the end walls 20 of the scraper and in a plane forwardly of the points of connection 30 of the draft chains 28 thereto. By reason of the crossed arrangement of the chains 31 with respect to the draft chains 28, endwise movement of the scraper is also prevented, or is otherwise limited to a minimum amount of such play, during turning movements of the tractor, and consequently, this endwise strain which would ordinarily be formed directly by the draft chains 28, is fully sustained by the chains 31, and only the actual strain of draft is borne directly by the draft chains 28.

For controlling the operation of the scraper during the travel of the tractor, a pair of bars 33 are secured vertically of the rear vertical wall 19 of the same, and are formed at their upper ends to provide eyes 34 in which are secured the opposite ends of a flexible cable or rope 35, which has oppositely disposed intermediate portions of the same wound around flanged pulleys or drums 36, which are secured by means of brackets 37 to the inner sides of the traction wheels 14, the looped medial portion of the cable or rope 35 being disposed forwardly of the tractor and to a point immediately in front of the dash 15, where it is trained through an eye or the like 38 in a manner to admit of the oppositely extending stretches thereof being readily grasped by an operator in the seat 16 for desired manipulation. The opposite stretches of the cable or rope 35 are wound on the drums 36 in a manner that, during the forward and backward travel of the tractor, the pulleys or drums 36 rotate within the convolutions thereof, so as not to effect any winding action thereto, but as soon as the operator grasps the medially looped portions and draws in the slack, the cable or rope portions will be wound on the pulleys or drums 36, during the forward direction of travel of the tractor for purposes which will be hereinafter readily apparent.

Secured to the outer faces of the end walls 20 of the scraper are a pair of bars 39 which have their free end portions inclining in an upward and forward direction of the open front side of the scraper, and these end portions of the bars 39 are of a length to engage over the circular end portions 27 of the transverse supporting bar 26, when the scraper is tilted in a forward direction, or to load dumping position, as shown in Fig. 3, and act in conjunction with the bar ends 27 to fully support the scraper in raised position above the ground surface, as shown in Fig. 4, when the scraper is tilted in the forward direction beyond the ordinary tilted position of dumping. To facilitate the movement of the scraper to and from its raised inoperative position, a guide rod or bar 40 is extended rearwardly and medially from the upper side of the differential housing 11 of the tractor, and the rear end portion 41 of this bar or rod 40 is inclined downwardly for engagement through a guide bail or loop 42 carried at a central point on the top edge of the rear vertical wall 19 of the scraper. For limiting the elevating movement of the scraper when it is raised or shifted to inoperative position, a latch hook or keeper 43 is provided on the bar or rod 40 at a point forwardly of the connected end of the inclined rear end portion thereof, and the same is engaged by the bail or loop 42 when the scraper is tilted forwardly to its fully raised position. To allow for the forward tilting of the scraper to its raised position, and to assure of the engagement of the bail or loop 42 with the hook or keeper 43, the guide bar or rod 40 is hinged to the differential housing 11, as at 44, so as to have a vertical swinging movement during the tilting movement of the scraper, and whereby the bail or loop 42 will freely move along the inclined portion 41 thereof and onto the forward and substantially horizontal portion of the same for the purpose.

In the operation of the tractor and scraper mechanisms as thus provided and connected one to the other, and with the opposite stretches of the cable 35 extended their full length, as shown in Fig. 2, to allow the scraper to assume its load carrying position, and it is desired to load the latter, the operator grasps the looped end portion of the cable 35 and takes in the slight slack thereto to increase the friction of the wound portions thereof on the drum 36, when, assuming the tractor to be moving in a forward direction, the opposite end portions of the cable will be wound in the direction to tilt the scraper in a forward direction, and only sufficiently to take the earth cutting position, as shown in Fig. 3. Now, with the further forward movement of the tractor, the cable 35 is partially released, and the rear ends of the same slack rearwardly to allow the scraper to tilt in the rearward direction to loading position as shown in Fig. 5, and, when fully loaded, the remainder of the cable 36 is allowed to slack in the rearward direction, so that the scraper will again assume the position as shown in Fig. 2, wherein the cutting edge 18 thereof is raised upon the ground surface. The tractor will now be directed to the point of dumping, or in the case of the stalling of the tractor by the heavy load within the scraper before reaching the desired point of dumping, when the operator will again grasp the looped end of the cable 35 to tighten the same on the drums 36 for the winding in of the opposite end portions thereof to tilt the scraper in a forward direction and to its dumping position as shown in Fig. 3. By pulling the looped end of the cable 35, so as to take in the slack thereof during this winding movement, the forward tilting movement of the scraper will be continued from such dumping position to its fully raised position, when the free ends of the bars 39 will engage over the bar ends 27 and the bail or loop 42 will ride up the inclined end portion 41 of the guide bar 40, until the bail or loop engages under the latch hook or keeper 43. The scraper now remains in its raised latch position as long as the cable 35 is held free from slacking off movement in a rearward direction, and until the next scraping operation is to be performed, when, by slacking off on the looped end portion of the cable, the end portions thereof will slip rearwardly from the drums 36 under the strain of the weight of the scraper on the rods 40, and allows the latter to swing downwardly so that the bail or loop 42 slides out of engagement with the latch or keeper 43, and the scraper moves rearwardly to the position as shown in Fig. 2, when it is again ready for the scraping or loading operation.

From the foregoing, it will be readily apparent that, while a preferred embodiment of the scraper attachment has been described and illustrated herein in specific terms and details of construction, arrangement and operation, various modifications of and changes in the same may be resorted to without departing from the spirit of the invention, or the scope of the claims appended hereto.

Having thus described the invention, what I claim as new, is:—

1. The combination with a wheeled tractor, of a scraper having draft connections to the tractor, a support carried on the tractor, and a normally slack and manually controlled means operable from the wheels of the tractor for raising said scraper onto said support and out of contact with the ground during the travel of the tractor and when not actually engaged in earth scraping operations.

2. The combination with a wheeled tractor, of a scraper disposed in rear of the tractor and having draft connections therewith, a transverse support carried at the rear of the tractor, and a normally slack and manually controlled means operable from the wheels of the tractor for raising said scraper onto the end terminal portions of said support and out of contact with the ground during the travel of the tractor and when not actually engaged in earth scraping operations.

3. The combination with a wheeled tractor, of a scraper attachment therefor, including a scraper body, flexible draft connections between the tractor and said scraper body, flexible means for preventing endwise play to said scraper, a transverse support carried at the rear of the tractor and projecting laterally with respect to said scraper body, and a normally slack and manually controlled means operable from the wheels of the tractor for raising said scraper body onto said support and out of contact with the ground during the travel of the tractor and when not actually engaged in earth scraping operations.

4. The combination with a wheeled tractor, of a scraper attachment therefor, flexible draft connections between the tractor and said scraper, flexible means for preventing endwise play to said scraper, a support carried at the rear of the tractor, manually controlled means operable from the wheels of the tractor for raising said scraper onto said support and out of contact with the ground during the travel of the tractor and when not actually engaged in earth scraping operations, and means for latching said scraper in its raised position.

5. The combination with a wheeled tractor, of a scraper attachment therefor, flexible draft connections between the tractor and said scraper, flexible means for preventing endwise play to said scraper, a support carried at the rear of the tractor, manually controlled means operable from the wheels of the tractor for raising said scraper onto said support and out of contact with the ground during the travel of the tractor and when not actually engaged in scraping operations, means for guiding said scraper in its movements to and from raised position, and means cooperative with said guide means for latching said scraper in its raised position.

6. A scraper attachment for tractors comprising a pair of bars adapted to project rearwardly from a tractor body, a scraper body, a supporting member carried by and projecting outwardly from each of said bars, flexible members projecting rearwardly from said bars connected with the scraper body, and a winding element adapted to be driven from a tractor body and operating to shift the scraper body to elevated or dumping position on said member.

7. A scraper attachment for tractors comprising a pair of bars projecting rearwardly from a tractor body, a scraper body, a supporting member carried by and projecting outwardly from each of said bars, flexible members projecting rearwardly from said bars connected with the scraper body, a winding element adapted to be driven from a tractor body and operating to shift the scraper body to elevated or dumping position on said member, and means secured to and projecting forwardly of the scraper body and cooperating with said element member for maintaining the scraper body in elevated or dumping position.

8. A scraper attachment for tractors comprising a pair of bars projecting rearwardly from a tractor body, a scraper body, a supporting member carried by and projecting outwardly from each of said bars, flexible members projecting rearwardly from said bars connected with the scraper body, a winding element adapted to be driven from a tractor body and operating to shift the scraper body to elevated or dumping position on said membr, means secured to and projecting forwardly of the scraper body and cooperating with said element and member for maintaining the scraper body in elevated or dumping position, and a pivoted scraper body guide arranged over said supporting member.

9. A scraper attachment for tractors comprising a pair of bars projecting rearwardly from a tractor body, a scraper body, a supporting member carried by and projecting outwardly from each of said bars, flexible members projecting rearwardly from said bars connected with the scraper body, a winding element adapted to be driven from a tractor body and operating to shift the scraper body to elevated or dumping position on said member, means secured to and projecting forwardly of the scraper body and cooperating with said element and member for maintaining the scraper body in elevated or dumping position, a pivoted scraper body guide arranged over said supporting member, and means for limiting the elevating movement of the scraper body when said body is elevated or shifted to dumping position.

10. In combination a scraper body, a tractor operated winding element, means for connecting said element to the rear of said body, a pair of bars adapted to be secured to and project rearwardly from a tractor, flexible connections between the sides of said body and said bars, and a supporting member carried by and projecting laterally from said bars and upon which said body shifts when elevated by said element.

11. In combination a scraper body, a tractor operated winding element, means for connecting said element to the rear of said body, a pair of bars adapted to be secured to and project rearwardly from a tractor, flexible conections between the sides of said body and said bars, a supporting member carried by and projecting laterally from said bars and upon which said body shifts when elevated by said element, and means carried by said body and cooperating with said element and member for maintaining said body in an elevated position when shifted to such position by said element.

12. In combination a scraper body, a tractor operated winding element, means for connecting said element to the rear of said body, a pair of bars secured to and projecting rearwardly from a tractor, flexible connections between the sides of said body and said bars, a supporting member carried by and projecting laterally from said bars and upon which said body shifts when elevated by said element, and a pair of bars projecting forwardly from said body and cooperating with said element and member for maintaining said body elevated when shifted to such position by said element.

13. In combination a scraper body, a tractor operated winding element, means for connecting said element to the rear of said body, a pair of bars secured to and projecting rearwardly from a tractor, flexible connections between the sides of said body and said bars, a supporting member carried by and projecting laterally from said bars and upon which said body shifts when elevated by said element, and means carried by said body and cooperating with said member for maintaining said body in an elevated position when shifted to such position by said element, a bail carried by said body, and a pivoted guide projecting rearwardly from a tractor and having said body slidably connected therewith by said bail.

14. In combination a scraper body, a tractor operated winding element, means for connecting said element to the rear of said body, a pair of bars secured to and projecting rearwardly from a tractor, flexible connections between the sides of said body and said bars, a supporting member carried by and projecting laterally from said bars and upon which said body shifts when elevated by said element, means carried by said body and cooperating with said member for maintaining said body in an elevated position when shifted to such position by said element, a bail carried by said body, a pivoted guide projecting rearwardly from a tractor and having said body slidably connected therewith by said bail, and means engaged by the bail when the scraper body is shifted for limiting the elevating movement of said scraper body.

15. In combination a tractor, a scraper, a support carried by and projecting rearwardly from the tractor, draft connections between said scraper and support, a normally slack winding cable slidably connected with the tractor and attached to said scraper and intermediate its ends at two points surrounding a tractor operated winding means therefor acting on the cable when the latter is manually pulled taut intermediate its ends whereby said scraper will be shifted to dumping position on said support.

16. In combination a tractor, a scraper, a support carried by and projecting rearwardly from the tractor, draft connections between said scraper and support, a normally slack winding cable slidably connected with the tractor and attached to said scraper and intermediate its ends at two points surrounding a tractor operated winding means therefor acting on the cable when the latter is manually pulled taut intermediate its ends whereby said scraper will be shifted to dumping position on said support, and means carried by the scraper and cooperating with said cable and support for maintaining said scraper in dumping position.

17. In combination a tractor, a scraper, a support carried by and projecting rearwardly from the tractor, draft connections between said scraper and support, a normally slack winding cable slidably connected with the tractor and attached to said scraper and intermediate its ends at two points surrounding a tractor operated winding means therefor acting on the cable when the latter is manually pulled taut intermediate its ends whereby said scraper will be shifted to dumping position on said support, means carried by the scraper and cooperating with said cable and support for maintaining said scraper in dumping position, and a pivoted guide secured to and projecting rearwardly from the tractor and having said scraper slidably connected therewith.

18. In combination a tractor, a scraper, a support carried by and projecting rearwardly from the tractor, draft connections between said scraper and support, a normally slack winding cable slidably connected with the tractor and attached to said scraper and intermediate its ends at two points surrounding a tractor operated winding means therefor acting on the cable when the latter is manually pulled taut intermediate its ends whereby said scraper will be shifted to dumping position on said support, means carried by the scraper and cooperating with said cable and support for maintaining said scraper in dumping position, a pivoted guide secured to and projecting rearwardly from the tractor and having said scraper slidably connected therewith, and said scraper and guide having cooperating means for locking the scraper in dumping position.

In testimony whereof, I affix my signature hereto.

EDGAR J. ANDREWS.